United States Patent
Chin et al.

(10) Patent No.: US 8,514,722 B2
(45) Date of Patent: Aug. 20, 2013

(54) HIGH SPEED CONTROL CHANNEL MONITORING IN A MULTICARRIER RADIO ACCESS NETWORK

(75) Inventors: Tom Chin, San Diego, CA (US); Guangming Shi, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 385 days.

(21) Appl. No.: 12/884,667

(22) Filed: Sep. 17, 2010

(65) Prior Publication Data

US 2011/0280131 A1   Nov. 17, 2011

Related U.S. Application Data

(60) Provisional application No. 61/333,535, filed on May 11, 2010.

(51) Int. Cl.
*H04W 24/00* (2009.01)

(52) U.S. Cl.
USPC .......................... 370/241; 370/329; 370/431

(58) Field of Classification Search
None
See application file for complete search history.

(56) References Cited

U.S. PATENT DOCUMENTS

| | | | |
|---|---|---|---|
| 6,731,614 B1* | 5/2004 | Ohlson et al. | 370/320 |
| 2003/0095513 A1* | 5/2003 | Woodmansee et al. | 370/324 |
| 2010/0254328 A1* | 10/2010 | McBeath et al. | 370/329 |
| 2012/0078933 A1* | 3/2012 | Kim et al. | 707/758 |
| 2012/0188961 A1* | 7/2012 | Suzuki et al. | 370/329 |

FOREIGN PATENT DOCUMENTS

EP   1916790 A1   4/2008

OTHER PUBLICATIONS

Ericsson et al: "HS-SCCH orders for 1,7,13, 4-carrier HSDPA", 19 3GPP Draft; RI-100593 HS-SCCH Orders for 4-Carrier HSDPA, 3RD Generation Partnership Project (3GPP), Mobile Competence Centre ; 650, Route Des Lucioles ; F-06921 Sophia-Antipolis Cedex ; France, vol . Ran WGI, No. Valencia, Spain; Jan. 18, 2010, Jan. 12, 2010, XP050418201.
International Search Report and Written Opinion—PCT/US2011/036146, International Search Authority—European Patent Office—Sep. 19, 2011.
Philips et al: "Analysis of HS-SCCH code 1,7,13, monitoring requirements for Dual-Cell 19 HSDPA", 3GPP Draft; RI-082801, 3RD Generation Partnership Project (3GPP), Mobile Competence Centre ; 650, Route Des Lucioles ; F-06921 Sophia-Antipolis Cedex ; France, No. Jeju; 20080812, Aug. 12, 2008, XP050316295.
Qualcomm Incorporated: "No. Of HS-SCCH 1-25 to monitor at UE for 3 and 4-carrier HSDPA", 3GPP Draft; RI-100280 Number Of HSSCCH to Monitor 3 4 Carriers, 3RD Generation Partnership Project (3GPP), Mobile Competence Centre ; 650, Route Des Lucioles ; F-06921 Sophia-Antipolis Cedex ; France,vol . Ran WGI, No. Valencia, Spain; XP050417958, Jan. 2010.

(Continued)

*Primary Examiner* — Chi Pham
*Assistant Examiner* — Shick Hom
(74) *Attorney, Agent, or Firm* — Kristine U. Ekwueme (57) ABSTRACT

User equipments (UEs) will monitor each frequency in a multicarrier wireless radio access network for at least one control channel that may contain downlink data allocations or other such messages from the network. This monitoring may be dynamically controlled with a physical layer indication received by the UE from a node B that designates a number of carrier frequencies of all of the carrier frequencies of the network. In response to this physical layer indication, the UE will monitor at least one control channel in the designated carrier frequency or frequencies.

23 Claims, 6 Drawing Sheets

(56) References Cited

OTHER PUBLICATIONS

Qualcomm Incorporated: "Physical Layer Design for 4C-HSDPA", 3GPP Draft; R1-100278_Physical Layer Design for 4C-HSDPA, 3RD Generation Partnership Project (3GPP), Mobile Competence Centre ; 650, Route Des Lucioles ; F-06921 Sophia-Antipolis Cedex ; France, vol . Ran WGI, No. Valencia, Spain;Jan. 18, 2010, Jan. 12, 2010,XP050417956.

ZTE: "HS-SCCH Order Mapping for Secondary Carrier (De-) Activation in 4C-HSDPA", 3GPP Draft; R1-100983_HS-SCCH_Order_SEC_Carrier_4C-HSD PA, 3RD Generation Partnership Project (3GPP), Mobile Competence Centre ; 650, Route Des Lucioles ; F-06921 Sophia-Antipolis Cedex ; France, vol. Ran WGI, No. San Francisco, USA; Feb. 22, 2010, Feb. 16, 2010, XP050418564.

* cited by examiner

*FIG. 8*

HIGH SPEED CONTROL CHANNEL MONITORING IN A MULTICARRIER RADIO ACCESS NETWORK

CROSS REFERENCE TO RELATED APPLICATION

This application claims the benefit of U.S. provisional patent application no. 61/333,535 filed May 11, 2010, in the names of CHIN et al., the disclosure of which is expressly incorporated by reference herein in its entirety.

BACKGROUND

1. Field

Aspects of the present disclosure relate generally to wireless communication systems, and more particularly, to high speed control channel monitoring in a multicarrier radio access network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communication in a multicarrier radio access network includes receiving a physical layer indication designating a number of carrier frequencies of a group of carrier frequencies in the multicarrier radio access network and monitoring at least one control channel in the designated carrier frequency or frequencies in response to the physical layer indication.

In an aspect of the disclosure, a UE configured for wireless communication in a multicarrier radio access network includes means for receiving a physical layer indication designating a number of carrier frequencies of a group of carrier frequencies in the multicarrier radio access network and means, executable in response to the physical layer indication, for monitoring at least one control channel in the designated carrier frequency or frequencies.

In an aspect of the disclosure, a computer program product, includes a computer-readable medium having program code recorded thereon. The program code includes code to receive a physical layer indication designating a number of carrier frequencies of a group of carrier frequencies in the multicarrier radio access network and code to monitor at least one control channel in the designated carrier frequency or frequencies in response to the physical layer indication.

In an aspect of the disclosure, a UE configured for wireless communication includes at least one processor and a memory coupled to the processor. The processor is configured to receive a physical layer indication designating a number of carrier frequencies of a group of carrier frequencies in the multicarrier radio access network and to monitor at least one control channel in the designated carrier frequency or frequencies in response to the physical layer indication.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
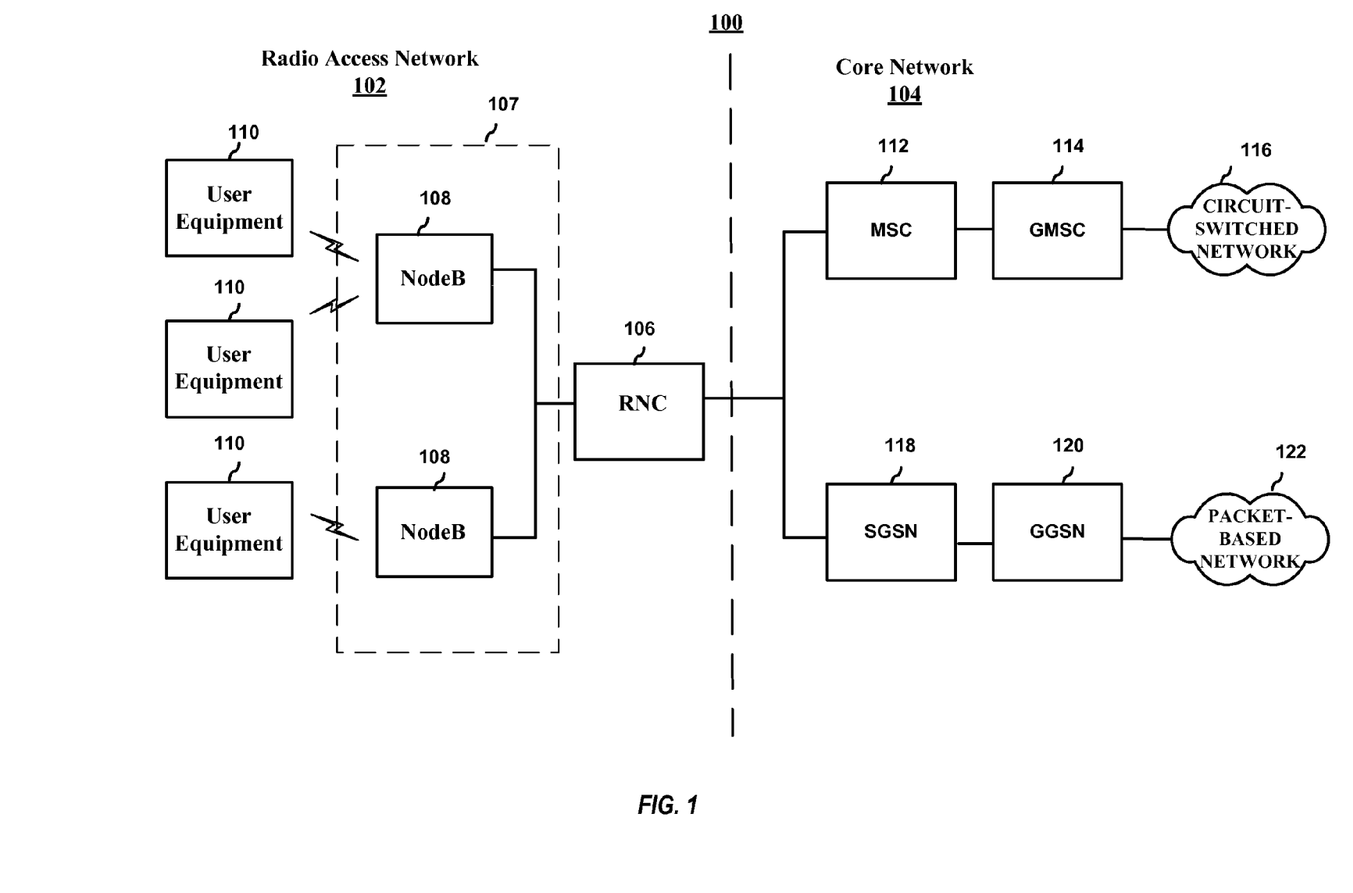
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a Base Station (BS), a Base Transceiver Station (BTS), a radio base station, a radio transceiver, a transceiver function, a Basic Service Set (BSS), an Extended Service Set (ESS), an Access Point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a Session Initiation Protocol (SIP) phone, a laptop, a notebook, a netbook, a smartbook, a Personal Digital Assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as User Equipment (UE) in UMTS applications, but may also be referred to by those skilled in the art as a Mobile Station (MS), a subscriber station, a mobile unit, a subscriber unit, a wireless unit, a remote unit, a mobile device, a wireless device, a wireless communications device, a remote device, a mobile subscriber station, an Access Terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a Mobile Switching Center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a Time Division Duplexing (TDD), rather than a Frequency Division Duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
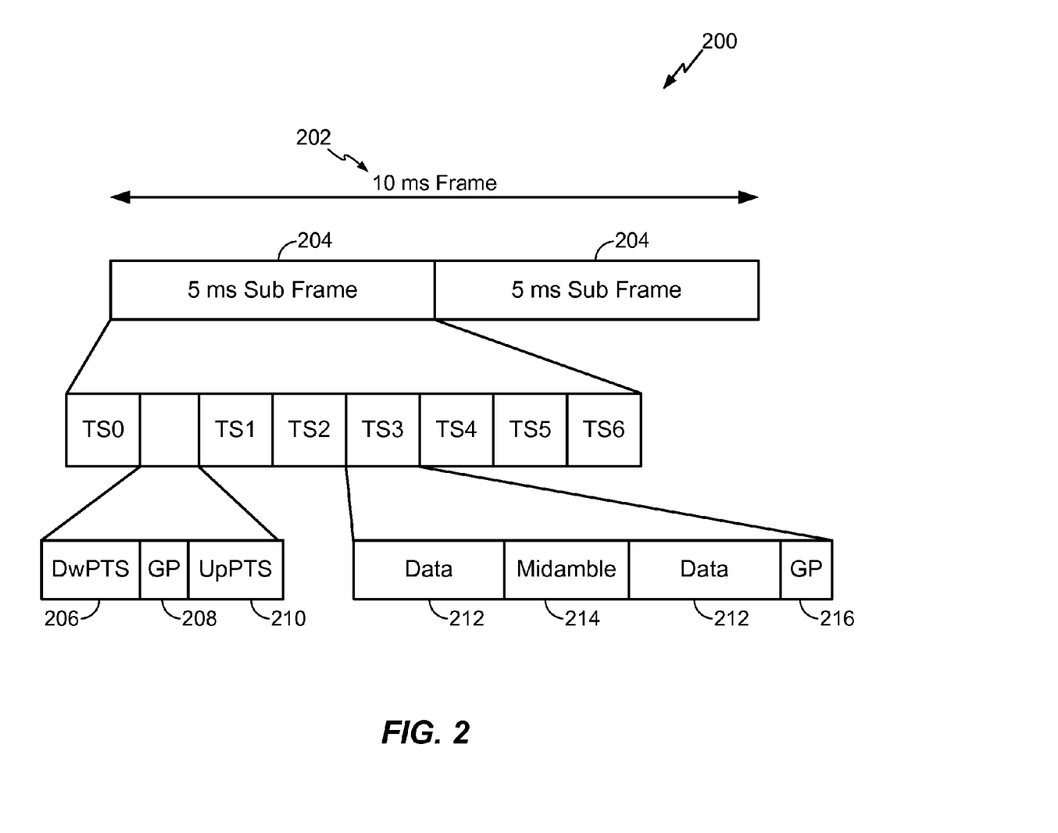
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
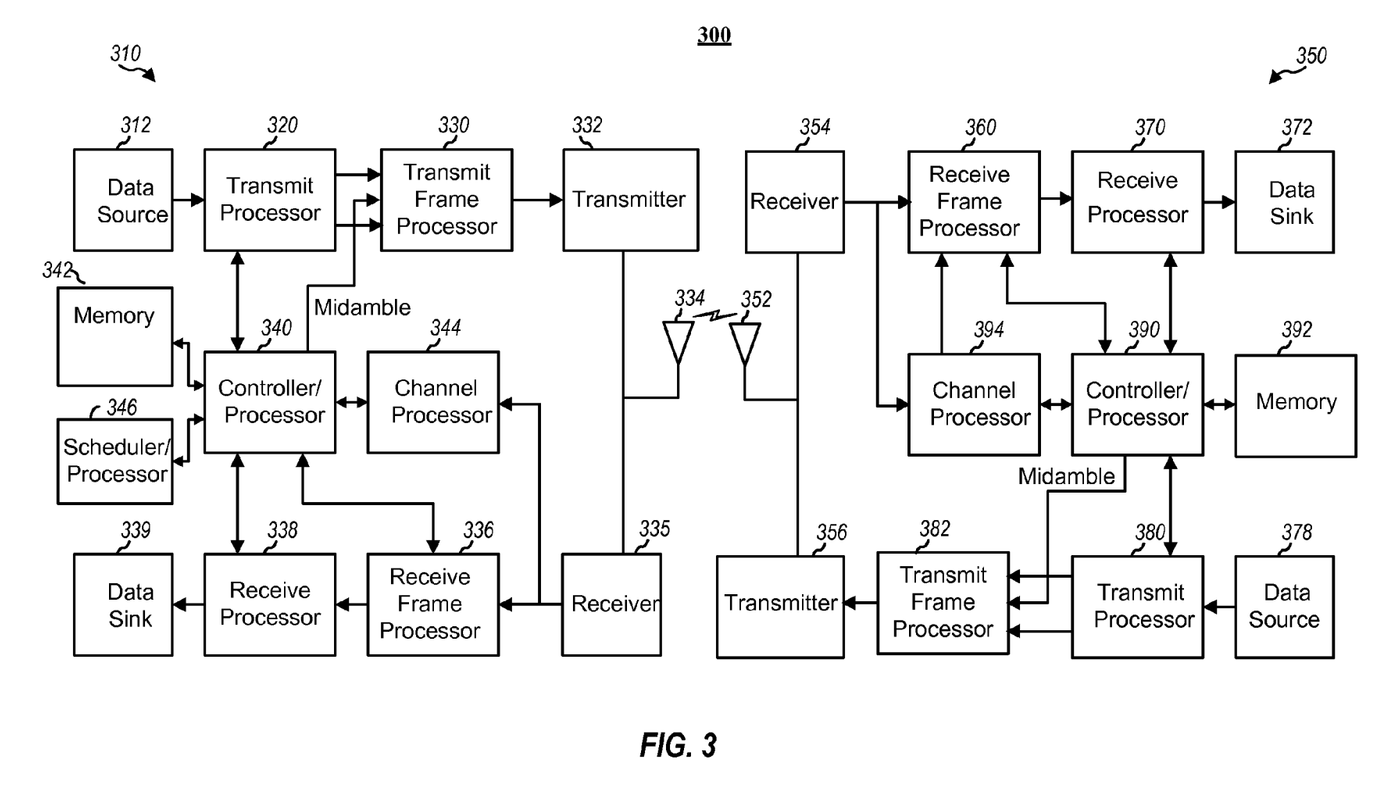
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide Cyclic Redundancy Check (CRC) codes for error detection, coding and interleaving to facilitate Forward Error Correction (FEC), mapping to signal constellations based on various modulation schemes (e.g., Binary Phase-Shift Keying (BPSK), Quadrature Phase-Shift Keying (QPSK), M-Phase-Shift Keying (M-PSK), M-quadrature Amplitude Modulation (M-QAM), and the like), spreading with Orthogonal Variable Spreading Factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an Acknowledgement (ACK) and/or Negative Acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an Acknowledgement (ACK) and/or Negative Acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a channel monitor module which, when executed by the controller/processor 390, configures the UE 350 to adjust its control channel monitoring based on a physical layer indication received from a node B. A scheduler/processor 346 at the node B 310 may be used to allocate resources to the UEs and schedule downlink and/or uplink transmissions for the UEs.

In order to provide more capacity, the TD-SCDMA system may allow multiple carrier signals or frequencies. Assuming that N is the total number of carriers, the carrier frequencies may be represented by the set $\{F(i), i=0, 1, \ldots, N-1\}$, where the carrier frequency, F(0), is the primary carrier frequency and the rest are secondary carrier frequencies. For example, a cell can have three carrier signals whereby the data can be transmitted on some code channels of a time slot on one of the three carrier signal frequencies. In the current TD-SCDMA standards, the total number of carriers has been limited to six different carrier frequencies.

Figure 4:
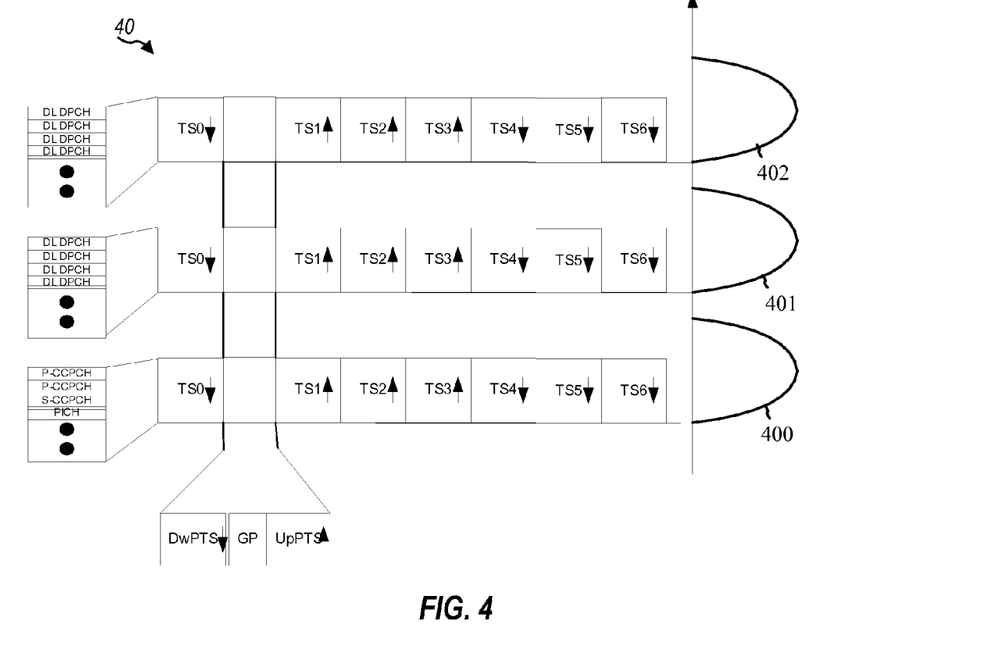
FIG. 4 is a block diagram conceptually illustrating carrier frequencies in a multi-carrier TD-SCDMA communication system according to one aspect of the present disclosure.

FIG. 4 is a block diagram conceptually illustrating carrier frequencies 40 in a multi-carrier TD-SCDMA communication system. The multiple carrier frequencies include a primary carrier frequency 400 (F(0)), and two secondary carrier frequencies 401 and 402 (F(1) and F(2)). In such multi-carrier systems, the system overhead may be transmitted on the first time slot (TS0) of the primary carrier frequency 400, including the Primary Common Control Physical Channel (P-CCPCH), the Secondary Common Control Physical Channel (S-CCPCH), the Paging Indicator Channel (PICH), and the like. The traffic channels may then be carried on the remaining time slots (TS1-TS6) of the primary carrier frequency 400 and on the secondary carrier frequencies 401 and 402. Therefore, in such configurations, a UE will receive system information and monitor the paging messages on the primary carrier frequency 400 while transmitting and receiving data on either one or all of the primary carrier frequency 400 and the secondary carrier frequencies 401 and 402.

It should be noted that the DwPTS and UpPTS may be configured on the primary carrier frequency 400 and the secondary carrier frequencies 401 and 402. However, a random access procedure may be performed with the primary carrier frequency 400, while the handover uplink synchronization procedure may be performed with either or both of the primary carrier frequency 400 and the secondary carrier frequencies 401 and 402.

The increased capacity provided in such multicarrier systems may be used in conjunction with high speed protocols, such as HSDPA. HSDPA defines several high speed physical channels, such as the High Speed Physical Downlink Shared Channel (HS-PDSCH), High Speed Shared Control Channel (HS-SCCH), and the High Speed Shared Information Channel (HS-SICH). The HS-PDSCH carries user data bursts. The HS-SCCH carries modulation and coding schemes, channelization codes, time slot and transport block size information about the data burst as well as the Hybrid-Automatic Repeat Request (HARQ) process, redundancy version, and new data indicator information for the data burst. The HS-SCCH also carries the HS-SCCH cyclic sequence number which increments UE-specific cyclic sequence numbers for each HS-SCCH transmission and the UE identity to indicate which UE should receive the data burst allocation. The HS-SICH carries the Channel Quality Indicators (CQI) that include a Recommended Transport Block Size (RTBS) and a Recommended Modulation Format (RMF), and the HARQ ACK/NACK (acknowledgements/negative acknowledgements) of the HS-PDSCH transmissions.

A UE will receive downlink data allocations on the HS-SCCH. Therefore, the UTRAN may signal the UE to monitor up to four HS-SCCHs in order to detect such data allocations on the HS-SCCH. The UE will receive data on the HS-PDSCH once downlink data allocation is made and will send HARQ acknowledgement in the HS-SICH. Multicarrier TD-SCDMA HSDPA offers an increase in the data rate of HSDPA. In multicarrier HSDPA, the UE may monitor up to four HS-SCCHs on each frequency of the multicarriers simultaneously. This may mean that the UE will monitor up to four HS-SCCHs on up to six frequency carriers simultaneously, for a total of twenty-four HS-SCCHs. However, this may unnecessarily increase power consumption or Central Processing Unit (CPU) processing in cases of lower downlink data rates.

Figure 5:
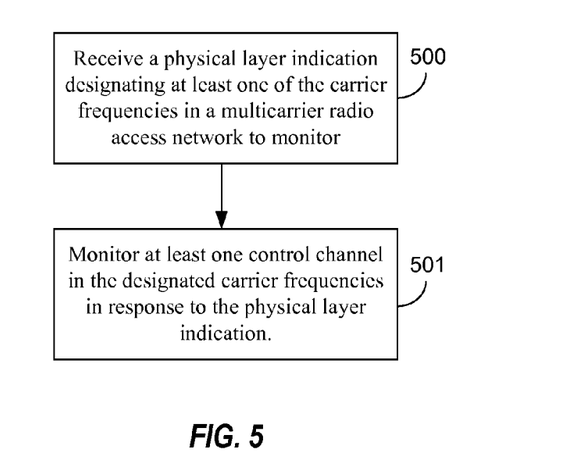
FIG. 5 is a functional block diagram conceptually illustrating example blocks executed to implement one aspect of the present disclosure.

In one aspect of the present disclosure, a new physical layer indication is defined that designates which of the carrier frequencies the UE is to monitor. FIG. 5 is a functional block diagram conceptually illustrating example blocks executed to implement one aspect of the present disclosure. In block 500, a physical layer indication is received designating at least one of the carrier frequencies in a multicarrier radio access network to monitor. In response to the physical layer indication, at least one control channel in the designated carrier frequencies is monitored in block 501.

Figure 6:
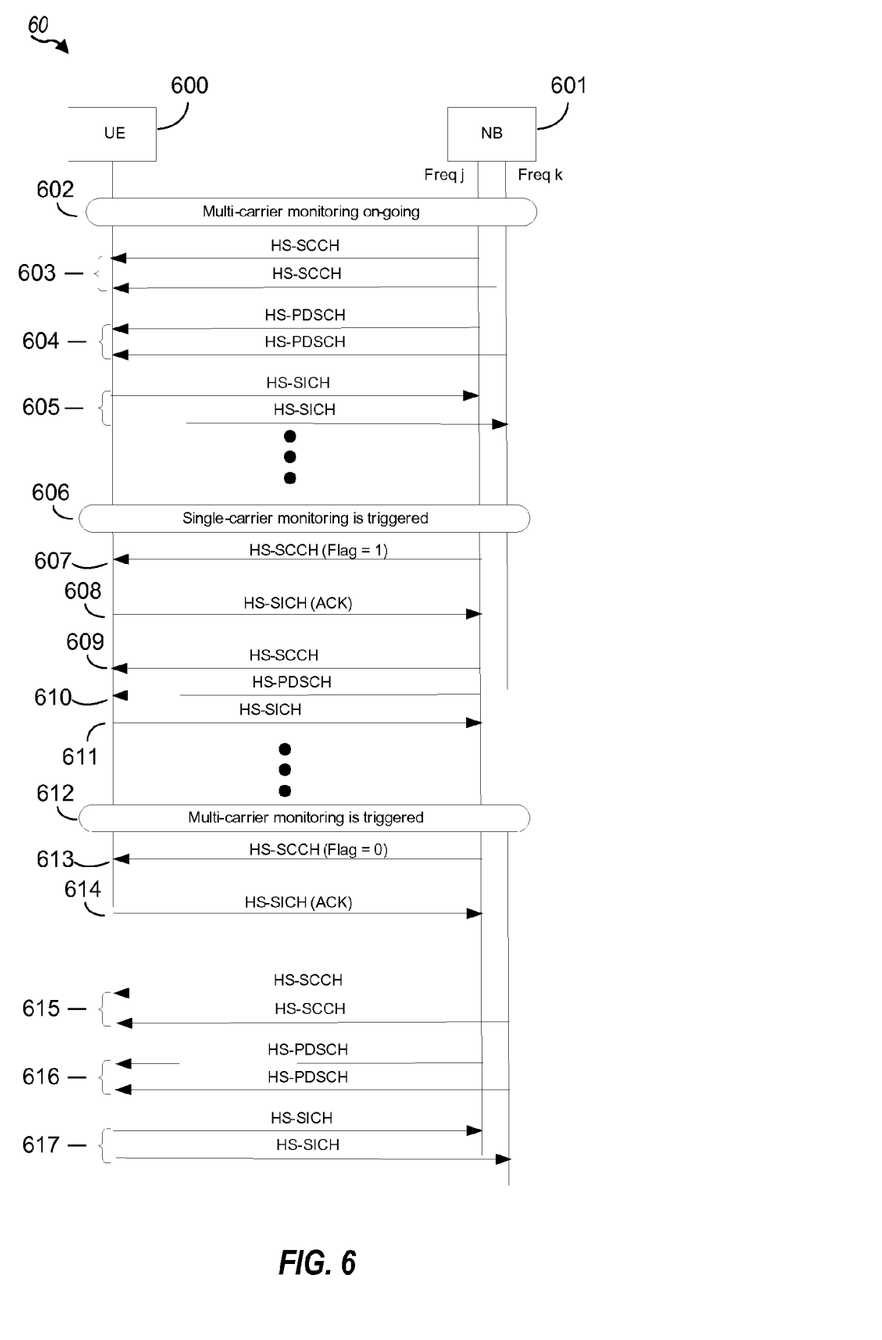
FIG. 6 is a call flow diagram conceptually illustrating a call flow in a multicarrier radio access network configured according to one aspect of the present disclosure.

The new physical layer indication may be used in various aspects of the disclosure to dynamically control the number of carrier frequencies on which the UE will monitor at least one control channel. FIG. 6 is a call flow diagram conceptually illustrating a call flow 60 in a multicarrier radio access network configured according to one aspect of the present disclosure. The call flow 60 illustrates the communication between a UE 600 and a node B 601. The node B 601 includes two carrier frequencies, j and k. At time 602, the UE 600 is performing multicarrier monitoring of frequencies j and k. The UE 600 monitors the HS-SCCH (at time 603) on frequencies j and k, receives data on the HS-PDSCH (at time 604) on frequencies j and k, and transmits any HARQ ACK/NACK on HS-SICH (at time 605) on frequencies j and k. As illustrated the new physical layer indication is sent on an HS-SCCH but may be sent on any of the HS-SCCHs on a particular frequency.

The downlink data demand for the UE 600 begins to diminish to a lower rate. In response to the lower data demand, at time 606, the node B 601 generates an HS-SCCH that includes a physical layer indication. The UE 600 receives the HS-SCCH with the physical layer indication at time 607. Upon reading the indication, the UE 600 transmits an ACK, at time 608, acknowledging receipt of the physical layer indication indicating that the UE 600 is to begin to monitor only the control channel on frequency j. The UE 600 monitors the control channel HS-SCCH for data allocations, at time 609, and receives data at time 610. At time 611, the UE 600 transmits any acknowledgement or negative acknowledgements to the node B 601.

At time 612, the downlink data demand for the UE 600 rises again, causing the node B 601 to generate an HS-SCCH with a new physical layer indication for multicarrier monitoring. The UE 600 receives the new physical layer indication, at time 613, and acknowledges receipt of the new physical layer indication, at time 614. The UE 600 again begins to monitor the control channel from both frequencies, j and k, at time 615, receives any downlink data from both frequencies, j and k, at time 616, and sends any acknowledgements on both frequencies, j and k, at time 617.

In one aspect of the present disclosure, the physical layer indication may be implemented as a flag bit or bits in a HS-SCCH orders type A. A HS-SCCH orders type A is defined in the 3GPP Release 8 and is different from the regular HS-SCCH. The HS-SCCH orders type A does not allocate data burst. Without allocating the data burst, there are a few reserved bits available that may be used for the physical layer indication flag. Also, HS-SCCH orders type A does not trigger any data to send on HS-PDSCH (because there is no downlink data allocation) but can still have HS-SICH HARQ ACK/NACK. Thus, the UE may use ACK/NACK to signal whether or not it accurately received the flag. In the example illustrated in FIG. 6, the flag is set to 1 to indicate single carrier monitoring and the flag is set to 0 to indicate multicarrier monitoring.

Figure 7:
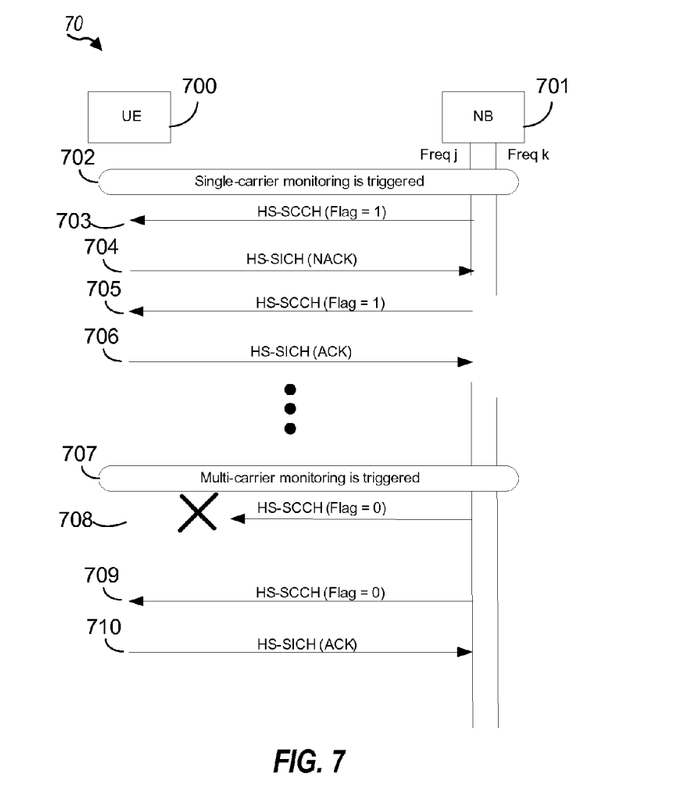
FIG. 7 is a call flow diagram conceptually illustrating a call flow occurring in a radio access network configured according to one aspect of the present disclosure.

FIG. 7 is a call flow diagram conceptually illustrating a call flow 70 occurring in a radio access network configured according to one aspect of the present disclosure. In the call flow 70, a UE 700 is in communication with a node B 701 having multiple carrier frequencies, j and k. At time 702, the node B 701 creates a HS-SCCH orders type A message with the physical layer indication flag set to cause single frequency monitoring. In this example, setting the flag to 1 causes single frequency monitoring. The UE 700 receives the HS-SCCH orders type A message at time 703. However, for some reason, the UE 700 cannot determine the value of the flag. At time 704, the UE 700 transmits a NACK message on the HS-SICH indicating the failure of the last indication. The node B 701 then resends the HS-SCCH orders type A message at time 705. The UE 700 receives the resent HS-SCCH orders type A message and reads the physical layer indication instructing it to begin monitoring for the control channels on frequency j. At time 706, the UE 700 transmits an ACK message on the HS-SICH indicating to the node B 701 that the indication was received successfully. The UE 700 then begins to monitor only the control channels on frequency j after time 706.

At time 707, the downlink data demand increases for the UE 700. This increase prompts the node B 701 to generate a new HS-SCCH orders type A message with a new physical layer indication flag set to cause multiple frequency monitoring. In this example, setting the flag to 0 causes multiple frequency monitoring. At time 708, the node B 701 transmit the new HS-SCCH orders type A message, however, the UE 700 never receives this message. The node B 701 does not receive either an ACK or NACK on the HS-SICH within the expected time. Therefore, at time 709, the node B 701 determines that the first HS-SCCH message was not received and re-transmits the HS-SCCH orders type A message with the multi-frequency monitoring physical layer indication flag set. The UE 700 receives the re-transmitted message and reads the physical layer indication flag instructing it to begin multi-frequency monitoring for the control channels on frequencies j and k. The UE 700 transmits an ACK message on the HS-SICH, at time 710, confirming the message. The UE 700 will then begin monitoring for the control channels on frequencies j and k after time 710.

It should be noted that in certain aspects of the present disclosure, the physical layer indication may direct the UE to simply switch from monitoring all of the carrier frequencies to only one of the carrier frequencies, or switch from monitoring one to all. In other aspects of the present disclosures, the physical layer indication may provide more monitoring options. For example, the physical layer indication may represent a subset of frequencies less than the total number of frequencies in the multicarrier network. With such an indication, the UE may be instructed to monitor any different number of the carrier frequencies from all of the frequencies down to a single frequency. The scope of the various aspects of the present disclosure is not limited to any particular number of frequencies the UE can be directed to monitor.

Figure 8:
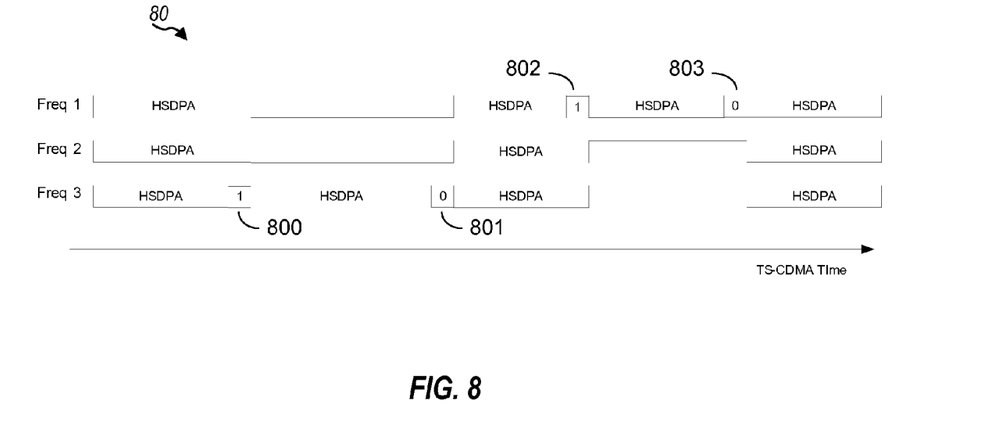
FIG. 8 is a diagram conceptually illustrating a multicarrier timeline in a radio access network configured according to one aspect of the present disclosure.

FIG. 8 is a diagram conceptually illustrating a multicarrier timeline 80 in a radio access network configured according to one aspect of the present disclosure. A node B (not shown) in the radio access network uses three carrier frequencies, frequencies 1, 2, and 3. A UE (not shown) monitors the control channels of each of the frequencies 1, 2, and 3. The flag '1' of physical layer indication 800 received by the UE indicates that the UE should begin to monitor only a single frequency. After receiving a physical layer indication 800, the UE monitors only the control channels in the frequency 3. In this embodiment, the location of the physical layer indication 800 in the frequency 3 identifies to the UE which of the three carrier frequencies to begin monitoring.

The UE receives another physical layer indication 801 on the frequency 3. The flag '0' indicates the UE should begin to monitor all of the carrier frequencies, frequencies 1-3. Thus, beginning after receipt of the physical layer indication 801, the UE begins monitoring all of the frequencies 1-3 again. During the course of its communication with the node B, the UE receives physical layer indication 802 prompting it to now only monitor the control frequency on frequency 1, and then, after receiving physical layer indication 803, monitoring control channels on all of the frequencies 1-3 again. Using the physical layer indications 800-803, the node B may dynamically control the UE's monitoring, which can reduce the power consumption of the UE when monitoring all of the carrier frequencies is unnecessary.

In one configuration, the apparatus, for example UE 350, for wireless communication includes means for receiving a physical layer indication designating at least one carrier frequency of a number of carrier frequencies to monitor in a multicarrier radio access network and means, executable in response to the physical layer indication, for monitoring at least one control channel in the designated carrier frequency or frequencies. In one aspect, the aforementioned means may be the antennas 352, the receiver 354, the receive frame processor 360, the channel processor 394, the receive processor 370, and the controller/processor 390 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, Digital Signal Processor (DSP), a Field-Programmable Gate Array (FPGA), a Programmable Logic Device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., Compact Disc (CD), Digital Versatile Disc (DVD)), a smart card, a flash memory device (e.g., card, stick, key drive), Random Access Memory (RAM), Read Only Memory (ROM), Programmable ROM (PROM), Erasable PROM (EPROM), Electrically Erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication in a multicarrier radio access network, comprising:
   monitoring a plurality of carrier frequencies;
   in response to lower downlink demand of a user equipment, receiving a physical layer indication designating one of the plurality of carrier frequencies in said multicarrier radio access network; and
   in response to said physical layer indication, monitoring at least one control channel in the designated carrier frequency and discontinuing monitoring of other carrier frequencies in the plurality of carrier frequencies.

2. The method of claim 1 wherein said physical layer indication comprises a flag embedded in a message from a node B.

3. The method of claim 2 wherein said message comprises a High Speed-Shared Control Channel (HS-SCCH) message.

4. The method of claim 1 wherein said physical layer indication is located on the designated carrier frequency.

5. The method of claim 1 wherein said multicarrier radio access network comprises a Time Division-Synchronous Code Division Multiple Access (TD-SCDMA) network.

6. The method of claim 1 further comprising:
   in response to increased downlink demand of the user equipment, receiving a second physical layer indication sent on the designated carrier frequency; and
   in response to the second physical layer indication, resuming monitoring the plurality of carrier frequencies.

7. A user equipment (UE) configured for wireless communication in a multicarrier radio access network, comprising:
   means for monitoring a plurality of carrier frequencies;
   means, operable in response to lower downlink demand of the UE, for receiving a physical layer indication designating one of the plurality of carrier frequencies in said multicarrier radio access network; and
   means, operable in response to said physical layer indication, for monitoring at least one control channel in the designated carrier frequency and for discontinuing monitoring of other carrier frequencies in the plurality of carrier frequencies in response to said physical layer indication.

8. The UE of claim 7 wherein said physical layer indication comprises a flag embedded in a message from a node B.

9. The UE of claim 7 wherein said multicarrier radio access network comprises a Time Division-Synchronous Code Division Multiple Access (TD-SCDMA) network.

10. The UE of claim 7 wherein said physical layer indication is located on the designated carrier frequency.

11. The UE of claim 7 further comprising:
    means, operable in response to increased downlink demand of the UE, for receiving a second physical layer indication sent on the designated carrier frequency; and
    means, operable in response to the second physical layer indication, for resuming monitoring the plurality of carrier frequencies.

12. A computer program product, comprising:
    a non-transitory computer-readable medium having program code recorded thereon, said program code comprising:
    program code to monitor a plurality of carrier frequencies;
    program code to receive a physical layer indication designating one of the plurality of carrier frequencies in a multicarrier radio access network in response to lower downlink demand of a user equipment; and
    program code to monitor at least one control channel in the designated carrier frequency and to discontinue monitoring of other carrier frequencies in the plurality of carrier frequencies in response to said physical layer indication.

13. The computer program product of claim 12 wherein said physical layer indication comprises a flag embedded in a message from a node B.

14. The computer program product of claim 13 wherein said message comprises a High Speed-Shared Control Channel (HS-SCCH) message.

15. The computer program product of claim 12 wherein said physical layer indication is located on the designated carrier frequency.

16. The computer program product of claim 12 wherein said multicarrier radio access network comprises a Time Division-Synchronous Code Division Multiple Access (TD-SCDMA) network.

17. The computer program product of claim 12 wherein the program code further comprises:
   program code to receive a second physical layer indication sent on the designated carrier frequency in response to increased downlink demand of the user equipment; and
   program code to resume monitoring the plurality of carrier frequencies in response to the second physical layer indication.

18. A user equipment (UE) configured for wireless communication, comprising:
   at least one processor; and
   a memory coupled to the at least one processor, wherein the at least one processor is configured:
      to monitor a plurality of carrier frequencies;
      to receive a physical layer indication designating one of the plurality of carrier frequencies in a multicarrier radio access network in response to lower downlink demand of the UE; and
      to monitor at least one control channel in the designated carrier frequency and to discontinue monitoring of other carrier frequencies in the plurality of carrier frequencies in response to said physical layer indication.

19. The UE of claim 18 wherein said physical layer indication comprises a flag embedded in a message from a node B.

20. The UE of claim 19 wherein said message comprises a High Speed-Shared Control Channel (HS-SCCH) message.

21. The UE of claim 18 wherein said physical layer indication is located on the designated carrier frequency.

22. The UE of claim 18 wherein said multicarrier radio access network comprises a Time Division-Synchronous Code Division Multiple Access (TD-SCDMA) network.

23. The UE of claim 18 wherein the at least one processor is further configured:
   to receive a second physical layer indication sent on the designated carrier frequency in response to increased downlink demand of the user equipment; and
   to resume monitoring the plurality of carrier frequencies in response to the second physical layer indication.

\* \* \* \* \*